United States Patent [19]

Spruit et al.

[11] Patent Number: 5,126,985
[45] Date of Patent: Jun. 30, 1992

[54] METHOD OF RECORDING INFORMATION ON A RECORD CARRIER OF THE THERMOMAGNETIC TYPE, AND DEVICE FOR CARRYING OUT THE METHOD

[75] Inventors: Johannes H. M. Spruit; Hendricus F. J. J. Van Tongeren, both of Waalre; Piet F. Bongers, Geldrop; Bernardus A. J. Jacobs, Veldhoven, all of Netherlands

[73] Assignee: U.S. Philips Corp., New York, N.Y.

[21] Appl. No.: 702,150

[22] Filed: May 14, 1991

Related U.S. Application Data

[63] Continuation of Ser. No. 277,622, Nov. 29, 1988, abandoned.

[30] Foreign Application Priority Data

Dec. 14, 1987 [NL] Netherlands ............ 8703011

[51] Int. Cl.⁵ ............ G11B 13/04; G11B 11/10; G11B 11/12
[52] U.S. Cl. ............ 369/13; 360/59; 360/114
[58] Field of Search ............ 369/13, 14; 360/59, 360/66, 114; 365/122

[56] References Cited

U.S. PATENT DOCUMENTS 4,712,203 12/1987 Saito et al. ............ 369/13

FOREIGN PATENT DOCUMENTS 0243656 11/1987 European Pat. Off.
0275323 7/1988 European Pat. Off.
57-78653 5/1982 Japan ............ 360/59

OTHER PUBLICATIONS

Hartmann et al., "Erasable magneto-optical recording", Philips Technical Review, vol. 42, No. 2, Aug. 1985, pp. 37-47.
Philips Technical Review, vol. 42, No. 2, pp. 38-47.

Primary Examiner—Stuart S. Levy
Attorney, Agent, or Firm—William L. Botjer

[57] ABSTRACT

When information is recorded on a record carrier (1) of the thermomagnetic type, the thermomagnetic recording layer (4) is scanned by a magnetic field generated by a magnetic-field modulator (7). The magnetic field is modulated depending on an information signal (Vi). Moreover, the scanned portion of the record carrier (1) is at the same time locally heated by radiation pulses (10) generated by an optical scanning device (5). By means of radiation pulses (10) the record carrier is heated above a write temperature (Ts), above which temperature the magnetization of the record carrier assumes the direction dictated by the magnetic field. A synchronizing circuit (9) generates the control signal (Vm) for modulating the magnetic field and the control signal (Vr) for generating the radiation pulses, in such a way that at the end of the radiation pulses the field strength is sufficiently high for the heated area of the record carrier to be magnetized in the directio dictated by the magnetic field.

12 Claims, 4 Drawing Sheets

METHOD OF RECORDING INFORMATION ON A RECORD CARRIER OF THE THERMOMAGNETIC TYPE, AND DEVICE FOR CARRYING OUT THE METHOD

This is a continuation of application Ser. No. 277,622, filed Nov. 29, 1988, now abandoned.

BACKGROUND OF THE INVENTION

The invention relates to a method of recording information on a record carrier having a recording layer of a thermomagnetic type, a pattern of magnetic domains having a first and a second direction of magnetization being formed in the recording layer by scanning the recording layer with a magnetic field which is modulated depending on an information signal and at the same time, by applying radiation, heating the recording layer locally in the area being scanned to a temperature above a write temperature, above which temperature the magnetization of the recording layer assumes a direction dictated by the magnetic field.

The invention further relates to a magneto-optical recording device for carrying out the above method, which recording device comprises a magnetic-field modulator for scanning the recording layer of the record carrier with a magnetic field which is modulated depending on an information signal, an optical system for applying, by means of a radiation beam, radiation energy to that portion of the recording layer which is scanned by the magnetic-field modulator in order to locally heat the scanned portion to a temperature above a write temperature, above which write temperature the magnetization of the recording layer assumes a direction dictated by the magnetic field.

Such a method and device are described in "Philips Technical Review", Vol. 42, no. 2, pp. 38-47. In said Review it is stated that it is, in principle, possible to form the pattern of magnetic domains by scanning the recording layer with a modulated magnetic field and at the same time heating the scanned portion with a constant-intensity laser beam. At the location of the heated portion the record carrier is then magnetized in conformity with the direction dictated by the modulated magnetic field. After cooling the magnetization of the record carrier persists, yielding a pattern of magnetic domains of opposite directions corresponding to the information signal.

The problem associated with this method, as stated in the above magazine, i.e. an inadequate speed of reversal of the magnetic field, has now been solved. For example, the non-prepublished Netherlands Patent Application no. 8702401 which corresponds to U.S. application Ser. No. 162,827 filed Mar. 3, 1988, now abandoned in favor of U.S. application Ser. No. 253,797 filed Oct. 4, 1988 now abandoned in favor of U.S. application Ser. No. 704,659 filed Jul. 20, 1991, describes a magnetic-field modulator which provides an adequate speed of reversal of the magnetic field. Since the above problem has been solved, the recording method described in the foregoing has become very attractive, because it enables previously recorded information to be readily overwritten without an additional erase operation being required.

The information is read via the rotation of the direction of polarization upon reflection of linearly polarized light. The read quality depends on the signal-to-noise ratio of the signal being read. The noise in the read signal comprises three major noise components, namely; disc noise, resulting from imperfections of the disc; read noise resulting from imperfections in the read process; and write noise resulting from imperfections in the write process.

In the meantime the attainable quality of the discs and that of the read processes have been improved to such an extent that during reading of these discs the write noise is predominant. Therefore, if a further improvement of the signal-to-noise ratio of the read signal is required, improvements in the write process aimed at reducing the write noise being must be pursued.

SUMMARY OF THE INVENTION

It is an object of the invention to provide a method and device as defined in the opening paragraphs, enabling the write noise to be reduced.

With respect to the method this object is achieved in that the radiation is applied as radiation pulses, a minimum time interval being maintained between the instants at which the direction of the magnetic field is reversed and the instants at which the radiation pulses terminate, in such a way that at the end of the radiation pulse the magnetic field is sufficiently strong for the portion heated above the write temperature to be magnetized in the direction dictated by the magnetic field.

In respect of the device this object is achieved in that the recording device comprises means for modulating the radiation-beam intensity so as to generate radiation pulses, and synchronizing means for maintaining a specific minimum time interval between the instants of reversal of the direction of the magnetic field and the ends of the radiation pulses.

The invention is based inter alia on the recognition of the fact that the write noise is mainly caused by the positional inaccuracy of the domains being formed. In the method and the device in accordance with the invention inaccuracies in the reversal of the magnetic field hardly affect the domain positions. The domain boundaries are determined mainly by the instants at which the radiation pulses cease. These instants of the radiation pulses can be adjusted far more accurately than the instants of reversal of the magnetic field. Indeed, the amount of magnetic energy stored in the magnetic field for the required field strength of a few hundreds of oersteds is so high that the speed with which the magnetic field can be reversed is substantially smaller than the speed with which the intensity of the radiation beam can be changed.

The fact that the record carrier is heated by means of radiation pulses has the additional advantage that during the formation of the magnetic domains the temperature gradient in the boundary region of the domains is substantially higher than the temperature gradient obtained in the case of exposure to a constant-intensity radiation beam, which also has a favourable effect on the positional accuracy of the domain boundaries.

Moreover, heating the recording layer by means of radiation pulses has the advantage that the thermal load applied to the recording layer and hence the speed with which the recording layer deforms is substantially lower than in the case of scanning with constant-intensity radiation.

A very large temperature gradient is obtained in an embodiment of the method which is characterized in that the duration of the radiation pulses is short relative to the period of the radiation pulses.

An embodiment of the method which is very suitable for recording a digital information signal of constant bit rate is characterized in that the frequency of the radiation pulses is equal to n times the bit rate, n being greater than or equal to 1.

A radiation-pulse frequency which is a multiple of the bit rate can be advantageous if the diameter of a single domain formed by means of a radiation pulse is smaller than the distance on the record carrier corresponding to the bit length. In that case it may be desirable to extend the domains representing one bit by one or more overlapping separate domains. If the diameter of the individual domains is larger than said distance it is preferred to select the frequency of the radiation pulses to be equal to the bit rate.

Moreover, it is preferred to adjust the time interval between the instant of reversal of the magnetic field and the end of the next radiation pulse in such a way that the instants of reversal of the magnetic field are situated substantially halfway between the ends of two successive radiation pulses. In that case the influence of disturbances resulting in a change of said time interval is minimal.

BRIEF DESCRIPTION OF THE DRAWINGS

Embodiments of the invention will now be described in more detail, by way of example, with reference to FIGS. 1 to 12, of which

DETAILED DESCRIPTION OF THE PREFERRED EMBODIMENTS

Figure 1:
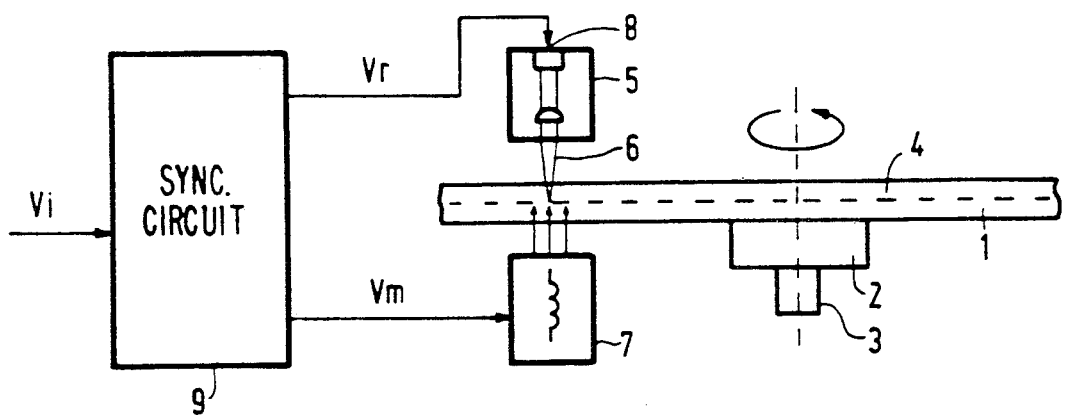
FIG. 1 shows an embodiment of a device in accordance with the invention.

FIG. 1 shows an embodiment of the device in accordance with the invention for recording information on a record carrier 1 provided with a thermo-magnetic recording layer 4 of a type as described in, for example, the aforementioned "Philips Technical Review", vol. 42, no. 2, pp. 38–47. The device comprises a turntable 2 and a drive means 3 for rotating the record carrier 1 about its axis. An optical scanning device is arranged opposite the rotating record carrier 1 and comprises an optical head 5 of a customary type, by means of which a radiation beam, for example a laser beam, is aimed at the record carrier, enabling the intensity of the laser beam to be modulated in conformity with a control signal Vr. For this purpose the optical head 5 may comprise for example a semiconductor laser 8 driven by the signal Vr. A magnetic-field modulator 7, arranged at the other side of the record carrier 1, opposite the optical head 5, is adapted to generate a magnetic field in the area of the recording layer 4 irradiated by the radiation beam 6. The magnetic-field modulator 7 is of a type in which the direction of the magnetic field can be modulated in conformity with a binary control signal Vm. Such a magnetic field modulator 7 is described in detail, inter alia in Netherlands Patent Application 8702451, herewith incorporated by reference.

The control signals Vr and Vm are derived from an information signal Vi by means of a synchronizing circuit 9. The control signal Vr comprises such a pulse-shaped signal that the intensity I of the laser beam is controlled between a high energy level Imax and a low energy level Imin.

Figure 2:
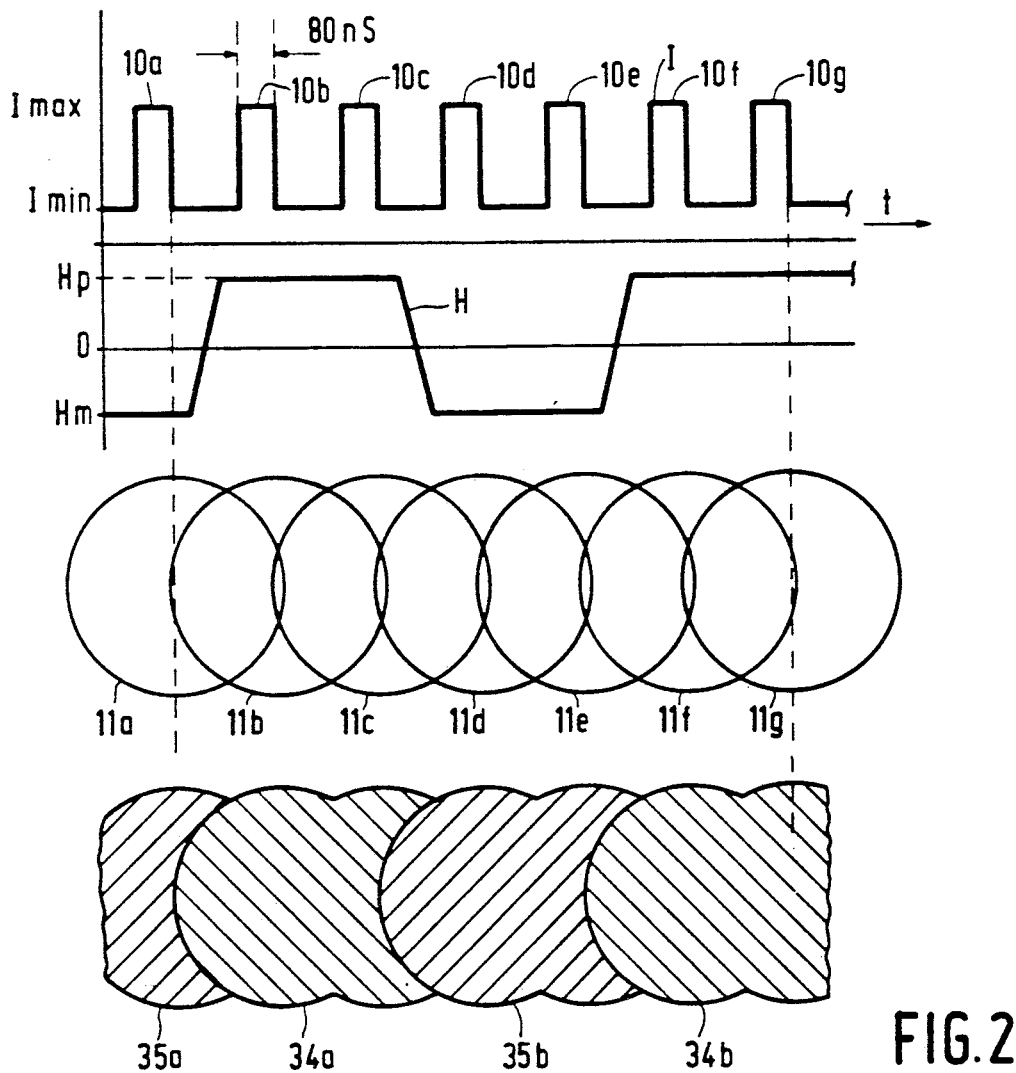
FIGS. 2, 7 and 8 illustrate the intensity of the radiation beam, the magnetic field strength as a function of time and the resulting pattern of magnetic domains for different embodiments of the invention.

The control signal Vm is such that the magnetic field produced in the recording layer 7 by the magnetic-field modulator 7 alternates between a value Hp and an opposite value Hm, as is illustrated as a function of time in FIG. 2.

How the control signals Vr and Vm are derived from the information signal will be described in more detail hereinafter.

Figure 3:
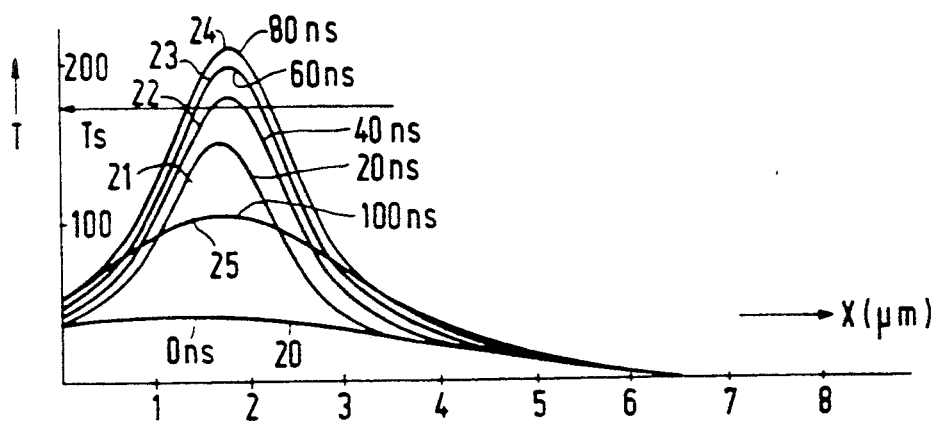
FIG. 3 shows the temperature gradient in the record carrier, when the radiation energy required for heating is applied by means of a radiation pulse.

However, the write process will be explained first with reference to FIGS. 2 and 3. During this write process the recording layer 4 is heated by the radiation pulses 10a . . . 10g. The resulting temperature gradient within the recording layer in the scanning direction (x) is indicated in FIG. 3 for the case that the duration of the radiation pulses is 80 ns, the scanning speed is 1.2 m/s, and the frequency of the radiation pulses is 4.32 MHz. These values for the frequency and scanning speed correspond to the customary bit rate and scanning speed in recording digital signals in conformity with the CD standard. The reference numerals 20, 21, 22, 23, 24 and 25 represent the temperature gradients at the beginning of the radiation pulse and 20 ns, 40 ns, 60 ns, 80 ns and 100 ns after the beginning respectively. As is apparent from FIG. 3 the temperature during generation of the radiation pulses rises rapidly above the write level Ts, until at the end of the radiation pulse (after 80 ns) the maximum value is reached. Subsequently the temperature decreases rapidly to below the write level Ts. The write level Ts represents the temperature above which the direction of magnetization of the recording layer 4 can be changed by the magnetic field thus generated.

In FIG. 2 the areas within the recording layer 4 which are heated above the write temperature Ts by the radiation pulses 10a, . . . , 10g are indicated by the reference numerals 11a, . . . , 11g.

When the generation of radiation pulses 10a ceases, the magnetic field is Hm, so that the area 11a is magnetized in a first direction defined by the direction of Hm. After the temperature of the recording layer 4 has decreased below the write temperature Ts the direction of the magnetic field is reversed.

At the end of the next radiation pulse 10b the temperature in the area 11b has increased above the write temperature Ts, so that this area 11b is magnetized in a second direction, opposite to said first direction. Since the areas 11a and 11b partly overlap one another, the direction of magnetization within the overlapping portion is reversed.

Subsequently, when the radiation pulse 10c is generated the area 11c is magnetized in the second direction. After this the areas 11d, 11e, 11f and 11g are magnetized, in the first and the second direction respectively, yielding a pattern of magnetic domains 35a and 35b of the first direction of magnetization and magnetic domains 34a and 34b of the second direction of magnetisation. It is to be noted that in FIG. 2 the direction of magnetization of the record carrier outside the domains 34 and 35 is not indicated. In reality, the recording layer outside said domains is magnetized in one of the two possible directions.

The length of the magnetic domains depends on the time intervals between the first radiation pulses 10a ... 10g after two successive reversals of the magnetic field. For the domain 34a this is the time interval between the instants of generation of the radiation pulse 10b and the radiation pulse 10d.

The accuracy with which a domain is positioned strongly depends on the temperature gradient at the boundary of the areas 11a ... 11g. and the strength of the magnetic field when the maximum temperature is reached.

Figure 4:
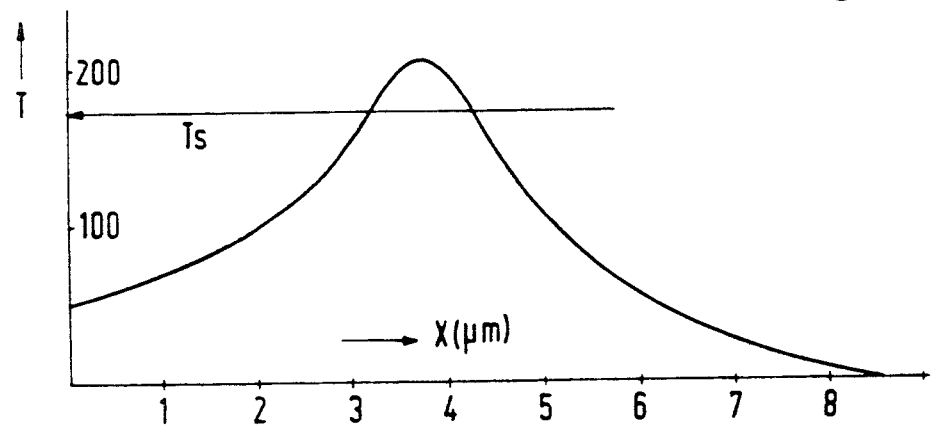
FIG. 4 shows the temperature gradient in the record carrier, when the radiation required for heating is applied by means of a constant intensity radiation beam.
Figure 12:
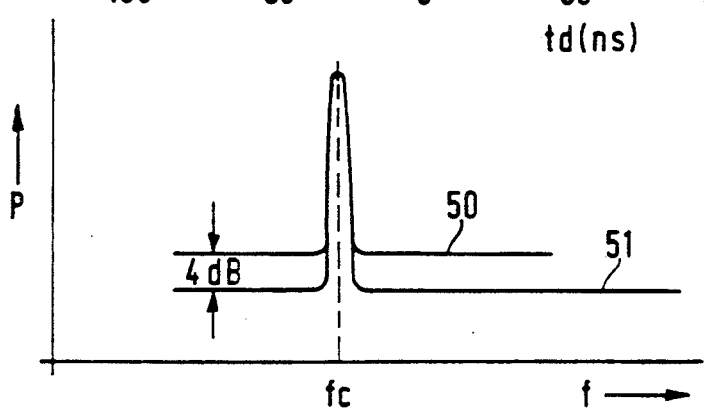

The influence of variations in laser intensity ambient temperature, write sensitivity and magnetic field on the position of the domain boundary decreases as this temperature gradient increases. Shifts of the domain boundaries as a result of these parameter variations will be referred to hereinafter as "domain jitter". Since the temperature gradient in the recording layer increases as the period of time within which the radiation energy needed to heat an area above the write temperature is applied decreases, it is therefore desirable to make the duration of the radiation pulses small relative to the period of the radiation pulses. FIG. 4 by way of illustration gives the temperature gradient in the record carrier when the radiation energy required for heating the recording layer 4 is applied by means of a constant-intensity laser beam. As is evident from a comparison of FIGS. 3 and 4 the temperature gradient upon heating with a constant-intensity laser beam is substantially lower (and hence the sensitivity to domain jitter is higher) than in the case of heating by radiation pulses. This domain jitter results in an increased noise level in the read signal during reading of the magnetic-domain pattern. Experiments have shown that in comparison with a write process by means of a constant-intensity laser beam the signal to noise ratio is 4 to 5 dB higher than in the case of the method in accordance with the invention. By way of illustration FIG. 12 gives the energy distribution of the read signal as a function of frequency when a signal of constant frequency fc is recorded. The reference numeral 50 gives the energy distribution in the case of recording with a constant radiation intensity. The energy distribution in the case that the signal is recorded by the method in accordance with the invention is indicated by the reference numeral 51. The horizontal portions indicate the noise levels. The height of the peak indicates the signal level.

In another experiment the inaccuracy of the domain length in a constant-laser-intensity write process was compared with the inaccuracy of the write method in accordance with the invention. The scanning speed was 1.4 m/s and the bit rate of the information signal was 4.32 MHz. In the case of the inventive method the standard deviation $\sigma$ of the domain jitter was found to correspond to 17 ns and in the case of in the constant-laser-intensity write process said standard deviation was found to correspond to 21 ns.

During this measurement the phase relationship between the radiation pulses and the magnetic-field modulation was optimized. The influence of this phase relationship on the domain jitter will be described comprehensively hereinafter.

Figure 5:
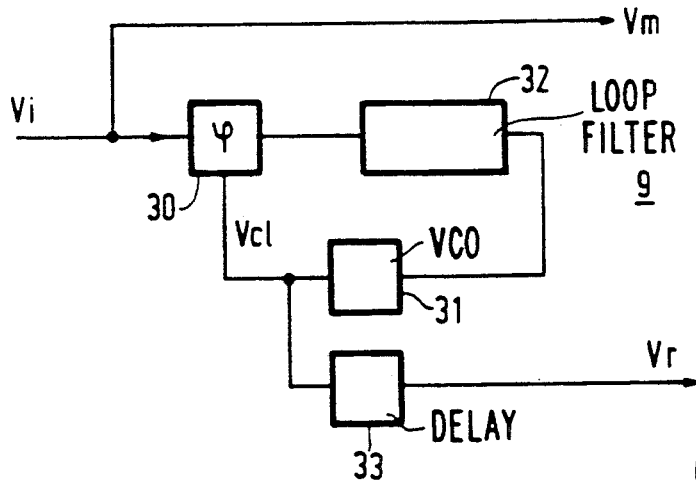
FIGS. 5 and 6 shows different examples of a synchronising circuit for use in the device in accordance with the invention.
Figure 7:
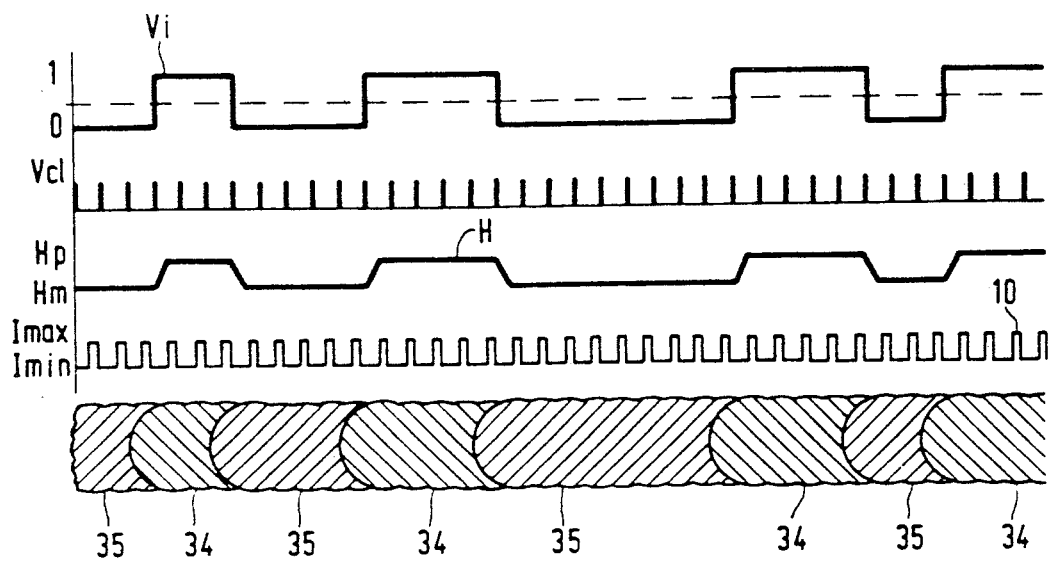

FIG. 5 shows a first example of a synchronizing circuit 9 adapted to control the process of recording digital information signals Vi of a specific bit rate, as shown for example in FIG. 7.

The synchronizing circuit comprises a circuit for recovering a channel clock signal Vcl of a frequency equal to the bit rate of the information signal Vi. Such a circuit may comprise a phase-detection circuit 30, which upon every zero crossing of the information signal Vc determines the phase difference between said zero crossing and the pulses of the channel clock signal Vcl generated by a voltage-controlled oscillator 31. A signal which is representative of the phase difference thus detected is applied to the control input of the voltage-controlled oscillator 31 via a loop filter 32. The phase-detection circuit 30, the loop filter 32 and the voltage-controlled oscillator 21 together constitute a phase-locked loop circuit of a customary type for recovering the channel clock signal Vcl.

The control signal Vr is derived from the channel clock signal Vcl by means of a delay circuit 33, which in response to every pulse of the channel clock signal Vcl generates a control pulse of predetermined width, which pulse is delayed by a predetermined time relative to the channel clock pulse.

The signal Vi functions as the control signal Vm for the magnetic-field modulator 7. The strength H of the magnetic field generated by the magnetic-field modulator 7 is also indicated in FIG. 7.

FIG. 7 further shows the radiation pulses 10 generated in response to the control signal Vr. Said delay time of the delay circuit 33 is adjusted in such a way that at the end of the radiation pulses the magnetic field is sufficiently strong for the area heated above the write temperature Ts by the radiation beam to be magnetised in the direction dictated by the direction of the magnetic field.

As a result of the magnetic-field modulation and the temperature rises produced by the radiation pulses a pattern of magnetic domains 34 of the first direction of magnetization and magentic domains 35 of the second direction of magnetization is formed in the recording layer 4, as is illustrated in FIG. 7. Each domain represents a sequence of bits of the same logic value, which is represented by the direction of magnetization. The length of the domains is representative of the number of bits in the sequence.

Figure 6:
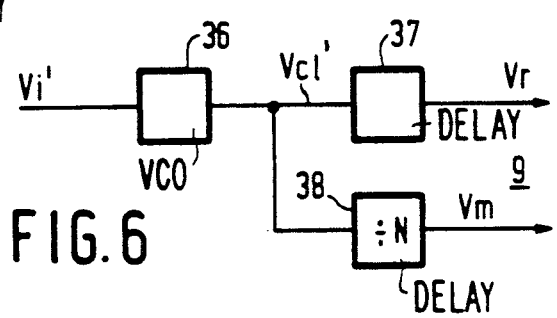

FIG. 6 shows a second example of the synchronizing circuit 9 adapted to control the process of recording analog information signals.

Figure 8:
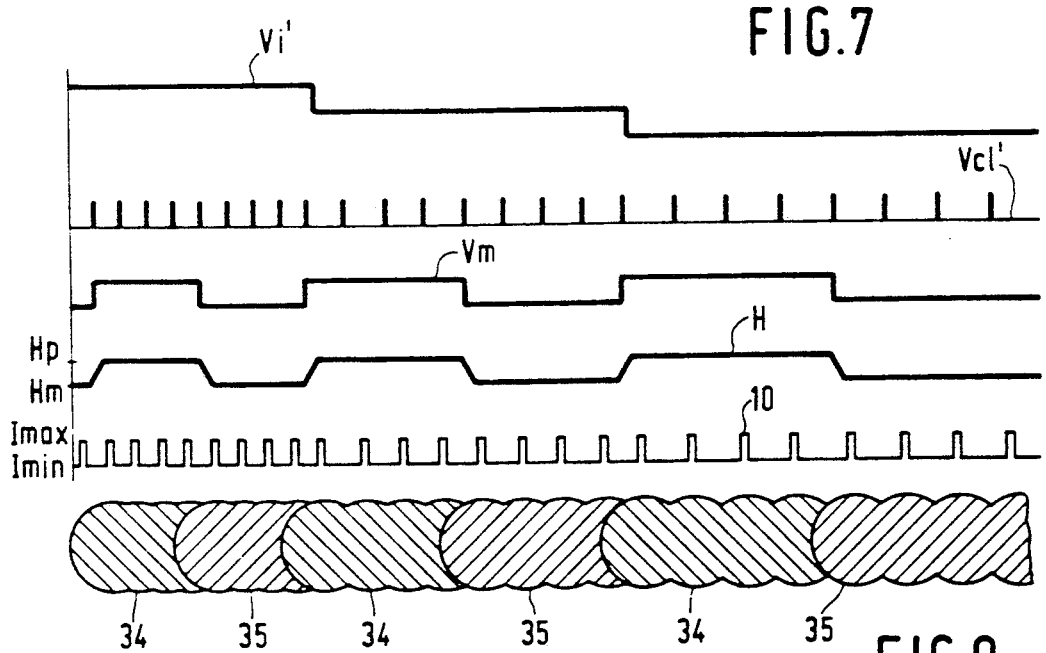

The circuit comprises a voltage-controlled oscillator 36 which is controlled by the analog information Vi', so that this oscillator generates a clock signal Vcl' of a frequency determined by the voltage level. The analog information signal Vi' and the clock signal Vcl' are given in FIG. 8. FIG. 8 shows only three different signal levels for the analog signal Vi'. However, it will be evident that the signal level may assume any value between a minimum and a maximum level. By means of a delay circuit 37 the control signal Vr is derived from the clock signal Vcl'. The delay circuit 38 is identical to the delay circuit 33 described with reference to FIG. 5. The control signal Vs is also derived from the clock signal Vcl'. For this purpose the synchronizing circuit 9 comprises a frequency divider having an input to which the clock signal Vcl' is applied and supplying an output signal which functions as the control signal Vm. In the present embodiment the divisor of the frequency divider is four, so that the frequency of the control signal Vs is ¼ of the frequency of the clock signal Vcl'. The control signal Vm and the field strength H of the magnetic field then generated by the magnetic-field modulator 7 are also given in FIG. 8.

FIG. 8 also shows the radiation of pulses 10a ... 10g generated in response to the pulses of the control signal Vr and the pattern of magnetic domains 34 and 35 produced by the magnetic-field modulation and the radiation pulses. The recorded pattern represents a frequency-modulated signal whose frequency corresponds to the signal level of the analog information signal Vi'.

This embodiment advantageously utilizes the fact that the successively heated areas 11a ... 11g overlap one another, so that the length of the domains can be varied within specific limits by adapting the frequency of the radiation pulses. When the spacing between two successive pulses is so small that the areas 11a ... 11g overlap one another a continuous domain is obtained.

The invention is not limited to the embodiments described in the foregoing. For example, it is possible to apply the radiation energy by means of radiation pulses whose intensity variation differs from the rectangular intensity variation shown herein. For example, the intensity level of a radiation pulse may first be given a first value which does not yet result in heating above the write temperature and briefly afterwards the intensity may be increased to a value which causes heating above the write temperature. Alternatively, the radiation pulse may comprise a plurality of subpulses, some of which serve as preheating pulses, the other radiation pulses serving as write pulses. However, it is always essential that the instant at which the temperature in the recording layer has reached the maximum value, i.e. at the end of the radiation pulse, the magnetic field strength is sufficiently high for the area heated above the write temperature to be magnetized in the direction dictated by the magnetic field.

Figure 9:
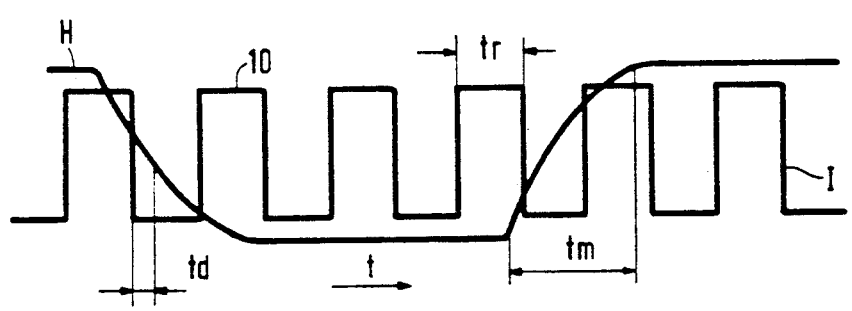
FIGS. 9, 10, 11 and 12 illustrate the reduction in write noise obtained by means of the method and the device in accordance with the invention.
Figure 10:
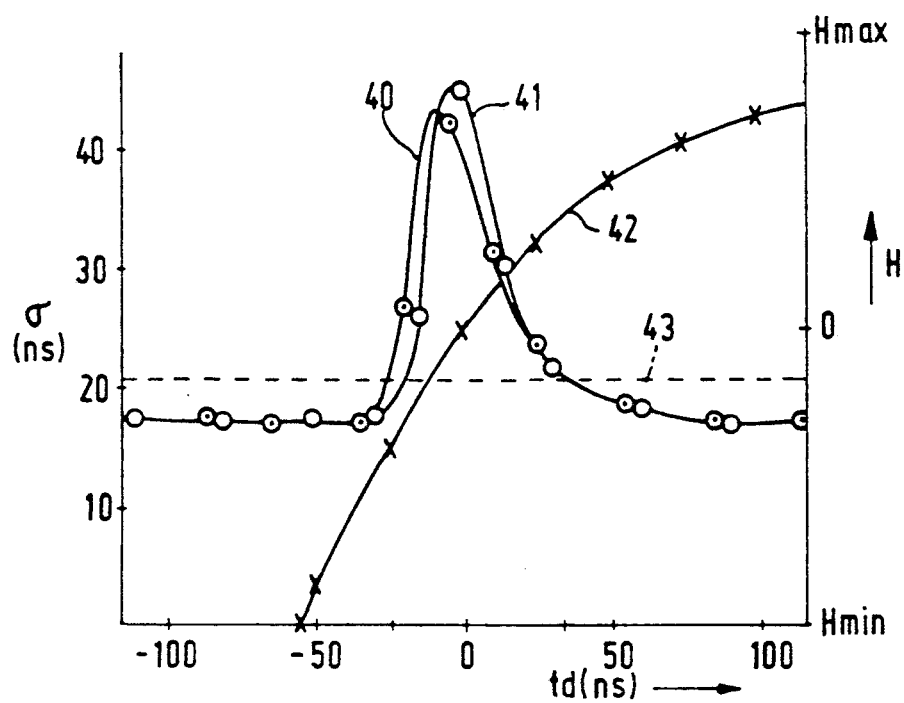

By way of illustration the curve 40 in FIG. 10 gives the standard deviation $\sigma$ of the domain jitter as a function of the time interval td between the instant at which the temperature in the recording layer 4 has reached the maximum value, i.e. at the end of the radiation pulse, and the instant at which the direction of the magnetic field is reversed in the case in that the repetition rate of the radiation pulse 10(a-g) is 4.32 MHz, the duration tr of the radiation pulse is 80 ns and the rise time of the magnetic-field modulation is 160 ns. (The associated variation of the radiation intensity I and the magnetic-field strength H are given in FIG. 9).

The curve 41 is the standard deviation of the domain jitter if the radiation-pulse duration tr is 115 ns instead of 80 ns. Moreover, the curve 42 in FIG. 10 indicates the strength of the magnetic field at the end of the radiation pulses 10a ... 10g. The broken line 43 represents the standard deviation of the domain jitter in the case that the radiation intensity is maintained constant.

FIG. 10 clearly shows that the domain jitter is reduced if at the end of the radiation pulse the field strength is higher than 40% of the final value (Hmax or Hmin).

Figure 11:
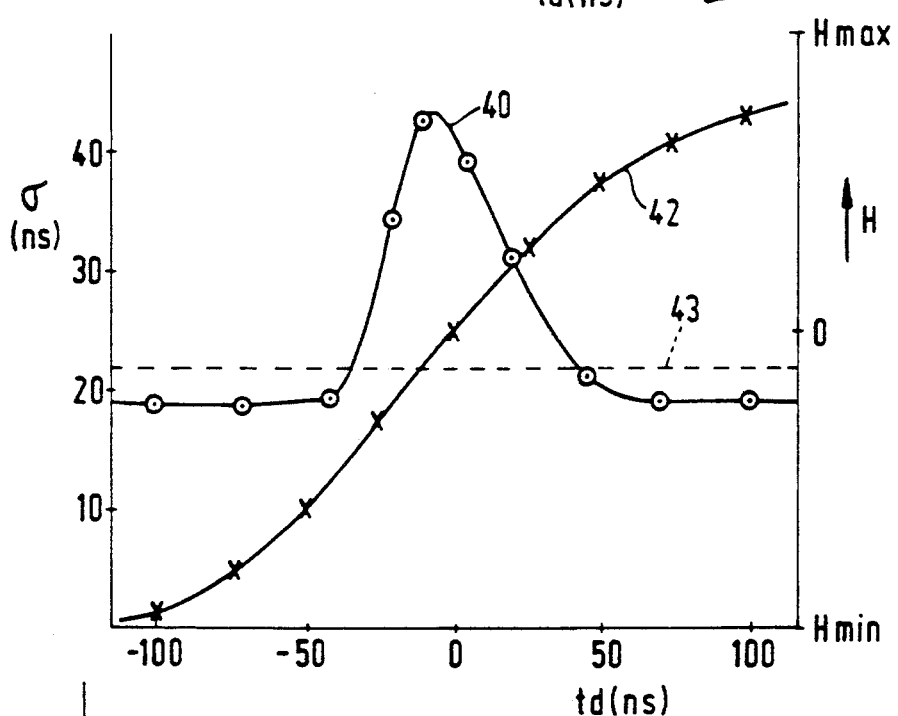

FIG. 11 again gives a curve 44 representing the standard deviation $\sigma$ of the domain jitter in the case that the radiation-pulse duration tr is 80 ns and the rise time tm is 200 ns. Again it can be seen that a reduction of the domain jitter is obtained if at the end of the radiation pulses 10a ... 10g the magnetic field strength is at least 40% of the final value.

In addition to said reduction of the domain jitter, the inventive method has the advantage that the thermal load to which the recording layer is subjected is reduced substantially. Indeed, when the recording layer is heated by radiation pulses the recording layer is heated only briefly above the write temperature, whilst in the case of heating with constant-intensity radiation the recording layer is continuously heated above the write temperature. The reduction of the thermal load results in the rate at which the material of the recording layer is deformed also being reduced. This reduction is of particular interest for uses where a record carrier with a preformed groove structure is inscribed very frequently, as is for example desirable for the temporary storage of data. For such uses the life of the record carrier depends also on the rate at which the preformed groove structure disappears as a result of thermal loading.

What is claimed is:

1. A method of recording information on a record carrier having a recording layer of thermomagnetic type, comprising the steps of:
    recording a pattern of magnetic domains having first and second directions of magnetization in said recording layer by scanning an area on said recording layer with a magnetic field modulated with the information signal to be recorded, said magnetic field having reversed magnetization directions, said magnetic field being generated by a magnetic field generating means while applying radiation pulses for heating the scanned area to a temperature above a write temperature, at which temperature the magnetization of the scanned area assumes a direction dictated in accordance with the scanned magnetic field;
    maintaining a minimum time interval between each of the points in time at which the magnetic field is reversed from one magnetization direction to the other and each of the points in time at which an individual radiation pulse of said radiation pulses terminates, in such a way that, at the end of the individual radiation pulse, the scanned magnetic field is sufficiently strong for the scanned and heated area of the recording layer to assume the dictated magnetization direction.

2. A method as claimed in claim 1, characterized in that the duration of the radiation pulses is short relative to the period of the radiation pulses.

3. A method as claimed in claim 1 or 2, characterized in that the information signal is a digital signal of a specific bit rate, the frequency of the radiation pulses being equal to n times the bit rate, n being greater than or equal to 1.

4. A method as claimed in claim 3, characterized in that n is 1.

5. a method as claimed in claim 1 characterized in that the points in time at which the direction of the magnetic field is reversed are situated substantially halfway between the points in time at which two successive radiation pulses end.

6. a magneto-optical recording device, comprising:
    magnetic field generating means including magnetic field modulating means for scanning a portion of a recording layer of a record carrier with a pulsed magnetic field which is modulated with an information signal to be recorded;
    means for applying a radiation energy beam to said scanned portion to locally heat said scanned portion to a temperature above a write temperature, at which temperature the magnetization of the scanned portion assumes a direction dictated in accordance with the scanned magnetic field;

means for modulating the intensity of said radiation energy beam so as to generate radiation pulses to said portion;

synchronizing means for maintaining a specific minimum time interval between each of the points in time of magnetic field reversals, at which the magnetic field is reversed from one magnetization direction to the other, and each of the points in time at which an individual radiation pulse of said pulses terminates, in such a way that, at the end of the individual radiation pulse, the scanned magnetic field is sufficiently strong for the scanned and heated portion to assume the dictated magnetization direction.

7. A recording device as claimed in claim 6, characterized in that the synchronizing means comprises means for maintaining a specific phase relationship between the pulse magnetic field and the radiation pulses modulation.

8. A recording device as claimed in claim 6 or 7, characterized in that the recording device is adapted to generate said radiation pulses of a duration which is relatively short compared to the time interval between the individual radiation pulses.

9. A recording device as claimed in claim 7, 8, characterized in that the synchronizing means comprises a phase detector for determining the phase difference of said pulsed magnetic field and said radiation pulses and means for adapting the periodic signal depending on the detected phase difference thus detected in such a way that the phase difference is maintained substantially equal to a specified value.

10. A recording device as claimed in claim 6, characterized in that the information signal is a digital signal of a specific bit rate, the synchronizing means being adapted to generate a periodic signal of a frequency equal to n times the bit rate, n being an integer greaer than or equal to 1.

11. A recording device as claimed in claim 10, characterized in that n is 1.

12. A recording device as claimed in claim 6, characterized in that the synchronizing means are adapted to maintain such a time interval between the ends of the radiation pulses and the points in time at which the magnetic-field direction is reversed so that the points in time of reversal are situated substantially halfway between the ends of two successive radiation pulses.

* * * * *